United States Patent
Agapiou et al.

(10) Patent No.: US 10,195,764 B2
(45) Date of Patent: *Feb. 5, 2019

(54) SET-DELAYED CEMENT COMPOSITIONS COMPRISING PUMICE AND ASSOCIATED METHODS

(71) Applicant: Halliburton Energy Services, Inc., Houston, TX (US)

(72) Inventors: Kyriacos Agapiou, Houston, TX (US); Thomas Jason Pisklak, Cypress, TX (US); Ronnie Glen Morgan, Waurika, OK (US); Samuel Jason Lewis, Spring, TX (US); Lance Everett Brothers, Oklahoma City, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/634,767

(22) Filed: Feb. 28, 2015

(65) Prior Publication Data

US 2015/0197033 A1 Jul. 16, 2015

Related U.S. Application Data

(63) Continuation-in-part of application No. 14/478,869, filed on Sep. 5, 2014, now Pat. No. 9,260,343, which
(Continued)

(51) Int. Cl.
*B29C 45/02* (2006.01)
*B29C 39/02* (2006.01)
(Continued)

(52) U.S. Cl.
CPC ............. *B28B 13/02* (2013.01); *B28B 1/14* (2013.01); *B28B 1/24* (2013.01); *B28B 13/021* (2013.01);
(Continued)

(58) Field of Classification Search
CPC ...................................... B28B 13/02
See application file for complete search history.

(56) References Cited

U.S. PATENT DOCUMENTS 2,609,882 A * 9/1952 Morgan ................ C04B 14/022
106/717
2,848,051 A 8/1958 Williams
(Continued)

FOREIGN PATENT DOCUMENTS

BR 200401373 A * 11/2005
CN 101333801 A * 12/2008
(Continued)

OTHER PUBLICATIONS

Final Official Action for U.S. Appl. No. 14/098,198 dated Jun. 19, 2015.
(Continued)

*Primary Examiner* — Atul P. Khare
(74) *Attorney, Agent, or Firm* — Thomas Rooney; Tumey L.L.P.

(57) ABSTRACT

Disclosed is a method of forming a set cement shape. The method comprises providing a set-delayed cement composition comprising water, pumice, hydrated lime, and a set retarder; forming the set-delayed cement composition into a shape; and allowing the shaped set-delayed cement composition to set.

12 Claims, 3 Drawing Sheets

Related U.S. Application Data is a continuation of application No. 13/417,001, filed on Mar. 9, 2012, now Pat. No. 8,851,173.

(51) Int. Cl.

| | | |
|---|---|---|
| *B28B 13/02* | (2006.01) | |
| *B29C 39/00* | (2006.01) | |
| *B28B 1/14* | (2006.01) | |
| *B28B 1/24* | (2006.01) | |
| *C04B 28/18* | (2006.01) | |
| *C04B 40/06* | (2006.01) | |
| *C09K 8/467* | (2006.01) | |
| *C04B 14/16* | (2006.01) | |

(52) U.S. Cl.
CPC ............ *B29C 39/003* (2013.01); *B29C 45/02* (2013.01); *C04B 28/18* (2013.01); *C04B 40/0658* (2013.01); *C09K 8/467* (2013.01)

(56) References Cited

U.S. PATENT DOCUMENTS

| | | | |
|---|---|---|---|
| 3,238,279 A | 3/1966 | Tarlton | |
| 3,557,876 A | 1/1971 | Tragesser | |
| 3,887,009 A | 6/1975 | Miller et al. | |
| 3,959,003 A | 5/1976 | Ostroot et al. | |
| RE28,945 E | 8/1976 | Miscovich et al. | |
| 3,979,217 A * | 9/1976 | Sutton | B28B 1/008 106/672 |
| 4,054,462 A | 10/1977 | Stude | |
| 4,266,889 A | 5/1981 | Rail et al. | |
| 4,349,443 A | 9/1982 | Block | |
| 4,350,533 A | 9/1982 | Galer et al. | |
| 4,455,171 A * | 6/1984 | Spensley | C04B 28/06 106/694 |
| 4,462,837 A | 7/1984 | Baker et al. | |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A | 5/1994 | Cowan et al. | |
| 5,421,922 A | 6/1995 | Sperber | |
| 5,447,197 A | 9/1995 | Rae et al. | |
| 5,503,671 A | 4/1996 | Casabonne et al. | |
| 5,547,506 A | 8/1996 | Rae et al. | |
| 5,645,375 A * | 7/1997 | Stephens | C04B 28/26 138/98 |
| 5,803,665 A * | 9/1998 | Stephens | C04B 28/26 138/98 |
| 6,173,778 B1 | 1/2001 | Rae et al. | |
| 6,221,148 B1 | 4/2001 | Mathur | |
| 6,279,655 B1 | 8/2001 | Pafitis et al. | |
| 6,333,005 B1 | 12/2001 | Nguyen et al. | |
| 6,354,058 B1 | 3/2002 | Lewis | |
| 6,372,694 B1 | 4/2002 | Osinga et al. | |
| 6,390,195 B1 * | 5/2002 | Nguyen | E21B 43/08 166/276 |
| 6,409,817 B1 | 6/2002 | Stephens | |
| 6,457,523 B1 | 10/2002 | Vijn et al. | |
| 6,488,762 B1 | 12/2002 | Shi | |
| 6,540,435 B1 * | 4/2003 | Lizarraga | E01C 19/4893 249/2 |
| 6,610,140 B2 | 8/2003 | Vijn et al. | |
| 6,753,081 B1 | 6/2004 | Lovett et al. | |
| 6,783,799 B1 | 8/2004 | Goodson | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,168,232 B2 | 1/2007 | Lovett et al. | |
| 7,199,086 B1 | 4/2007 | Roddy et al. | |
| 7,201,228 B2 | 4/2007 | Robb et al. | |
| 7,201,798 B2 | 4/2007 | Brothers et al. | |
| 7,204,307 B2 | 4/2007 | Roddy et al. | |
| 7,211,293 B2 | 5/2007 | Piana et al. | |
| 7,244,303 B2 | 7/2007 | Chatterji et al. | |
| 7,284,611 B2 | 10/2007 | Reddy et al. | |
| 7,325,611 B2 * | 2/2008 | Santra | C04B 24/20 166/293 |
| 7,338,923 B2 | 3/2008 | Roddy et al. | |
| 7,373,892 B2 | 5/2008 | Veazey | |
| 7,445,669 B2 | 11/2008 | Roddy et al. | |
| 7,452,930 B2 | 11/2008 | Kawakami et al. | |
| 7,478,675 B2 | 1/2009 | Roddy et al. | |
| 7,503,974 B2 | 3/2009 | Mintz et al. | |
| 7,514,910 B2 | 4/2009 | Jiang et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,576,042 B2 * | 8/2009 | Lewis | C04B 24/2676 166/293 |
| 7,603,959 B1 | 10/2009 | Veazey | |
| 7,617,870 B1 | 11/2009 | Roddy et al. | |
| 7,631,692 B2 | 12/2009 | Roddy et al. | |
| 7,654,326 B1 * | 2/2010 | Santra | C04B 28/32 106/684 |
| 7,670,427 B2 | 3/2010 | Perez-Pena | |
| 7,674,332 B2 | 3/2010 | Roddy et al. | |
| 7,694,738 B2 * | 4/2010 | Reddy | C04B 28/06 166/285 |
| 7,743,828 B2 | 6/2010 | Roddy et al. | |
| 7,757,765 B2 | 7/2010 | Hilleary et al. | |
| 7,762,205 B1 | 7/2010 | Veazey | |
| 7,770,455 B2 | 8/2010 | Stencel | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,048,219 B2 | 11/2011 | Woolfsmith | |
| 8,067,031 B2 | 11/2011 | Daniloff et al. | |
| 8,114,213 B2 | 2/2012 | Scheye | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,303,973 B2 | 11/2012 | Daniloff et al. | |
| 8,307,899 B2 | 11/2012 | Brenneis et al. | |
| 8,403,045 B2 | 3/2013 | Brenneis et al. | |
| 8,468,756 B2 | 6/2013 | Arguelles | |
| 8,460,708 B2 | 7/2013 | Daniloff et al. | |
| 8,476,203 B2 | 7/2013 | Patil | |
| 8,481,073 B2 | 7/2013 | Daniloff et al. | |
| 8,486,271 B2 | 7/2013 | Zhang et al. | |
| 8,486,437 B2 | 7/2013 | Daniloff et al. | |
| 8,486,869 B2 | 7/2013 | Brenneis et al. | |
| 8,492,317 B2 | 7/2013 | Chatterji et al. | |
| 8,492,471 B2 | 7/2013 | Albright et al. | |
| 8,505,630 B2 | 8/2013 | Chatterji et al. | |
| 8,530,034 B2 | 9/2013 | Khan et al. | |
| 8,603,239 B2 | 12/2013 | Gleeson et al. | |
| 8,623,794 B2 | 1/2014 | Chatterji et al. | |
| 8,702,881 B2 | 4/2014 | Yu et al. | |
| 8,706,915 B2 | 4/2014 | Duchesneau | |
| 8,707,914 B2 | 4/2014 | Barnes | |
| 8,728,609 B2 | 5/2014 | Torres et al. | |
| 8,851,173 B2 | 10/2014 | Brothers | |
| 8,899,329 B2 | 12/2014 | Chatterji et al. | |
| 8,910,708 B2 | 12/2014 | Chatterji et al. | |
| 9,227,872 B2 * | 1/2016 | Pisklak | C09K 8/428 |
| 9,260,343 B2 | 2/2016 | Brothers | |
| 9,328,583 B2 | 5/2016 | Pisklak | |
| 2002/0050232 A1 | 5/2002 | Yamashita et al. | |
| 2002/0162657 A1 | 11/2002 | Tumlin et al. | |
| 2003/0121456 A1 | 7/2003 | Griffith et al. | |

(56) References Cited

U.S. PATENT DOCUMENTS

| | | | |
|---|---|---|---|
| 2003/0127026 A1* | 7/2003 | Anderson | C04B 24/2647 106/724 |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 | 7/2004 | Goodwin | |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0041060 A1 | 2/2006 | George et al. | |
| 2006/0054320 A1 | 3/2006 | Brothers et al. | |
| 2006/0166834 A1 | 7/2006 | Roddy et al. | |
| 2006/0180960 A1* | 8/2006 | Munch-Laursen | B28B 11/0845 264/600 |
| 2006/0249054 A1 | 11/2006 | Brothers et al. | |
| 2006/0249289 A1 | 11/2006 | Brothers et al. | |
| 2007/0089643 A1 | 4/2007 | Roddy et al. | |
| 2007/0125534 A1 | 6/2007 | Reddy et al. | |
| 2007/0235192 A1 | 10/2007 | Michaux et al. | |
| 2007/0289744 A1 | 12/2007 | Bingamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0016828 A1* | 1/2009 | Guerrini | B28B 21/98 406/191 |
| 2009/0020044 A1 | 1/2009 | Constantz et al. | |
| 2009/0038800 A1 | 2/2009 | Ravi et al. | |
| 2009/0105099 A1 | 4/2009 | Warrender et al. | |
| 2009/0124522 A1 | 5/2009 | Roddy | |
| 2010/0006288 A1* | 1/2010 | Santra | C04B 28/32 166/292 |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0095871 A1 | 4/2010 | Patil | |
| 2010/0240556 A1 | 9/2010 | Keys et al. | |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0282466 A1 | 11/2010 | Brenneis et al. | |
| 2010/0292365 A1 | 11/2010 | Roddy | |
| 2010/0313795 A1 | 12/2010 | Guynn et al. | |
| 2011/0017452 A1 | 1/2011 | Benkley et al. | |
| 2011/0100626 A1 | 5/2011 | Brenneis et al. | |
| 2011/0132605 A1 | 6/2011 | Sarap et al. | |
| 2011/0162845 A1 | 7/2011 | Ravi | |
| 2011/0305830 A1 | 12/2011 | Frantz et al. | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0214901 A1 | 8/2012 | Bury | |
| 2012/0249552 A1 | 10/2012 | Harvill et al. | |
| 2012/0251079 A1 | 10/2012 | Meschter et al. | |
| 2012/0252304 A1 | 10/2012 | Vaughn | |
| 2012/0291674 A1 | 11/2012 | Brenneis et al. | |
| 2012/0325478 A1 | 12/2012 | Muthusamy et al. | |
| 2013/0048284 A1* | 2/2013 | Santra | C09K 8/467 166/292 |
| 2013/0233550 A1 | 9/2013 | Brothers et al. | |
| 2013/0248183 A1 | 9/2013 | Pisklak et al. | |
| 2013/0255949 A1* | 10/2013 | Kellum | C04B 24/163 166/293 |
| 2013/0260043 A1 | 10/2013 | Abdullah et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Ballew et al. | |
| 2014/0318419 A1 | 10/2014 | Chatterji et al. | |
| 2014/0373756 A1* | 12/2014 | Brothers | C04B 28/18 106/677 |
| 2014/0374097 A1* | 12/2014 | Morgan | C04B 28/02 166/293 |
| 2014/0374098 A1 | 12/2014 | Brothers et al. | |
| 2015/0175481 A1 | 6/2015 | Pisklak | |
| 2015/0175869 A1 | 6/2015 | Agapiou | |
| 2015/0197033 A1 | 7/2015 | Agapiou | |
| 2015/0197453 A1 | 7/2015 | Pisklak | |
| 2016/0075933 A1* | 3/2016 | Pisklak | C09K 8/428 106/795 |
| 2016/0244655 A1* | 8/2016 | Reddy | C09K 8/467 |

FOREIGN PATENT DOCUMENTS

| | | | |
|---|---|---|---|
| EP | 2644583 | 4/2012 | |
| FR | 2660359 A1 * | 10/1991 | E21B 33/138 |
| WO | 1996-02899 | 7/1996 | |
| WO | 2011-161411 | 12/2011 | |
| WO | 2013/134456 | 9/2013 | |
| WO | 2015034477 | 3/2015 | |

OTHER PUBLICATIONS

Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,486 dated Aug. 17, 2015.
Official Action for U.S. Appl. No. 14/048,463 dated Sep. 9, 2015.
Official Action for U.S. Appl. No. 14/478,813 dated Sep. 10, 2015.
Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
USPTO Non-Final Office Action for U.S. Appl. No. 14/478,813 dated Sep. 30, 2016.
E.B. Nelson. "Well Cementing". pp. 3-2. 1990.
ISRWO for PCT Application No. PCT/US2015/017564 dated Jun. 6, 2015.
ISRWO for PCT Application No. PCT/US2015/019709 dated May 22, 2015.
http://www.freedoniagroup.com/refractories.html; Demand and Sales Forecasts, Market Share, Market Size, Market Leaders, Freedonia Group, Dec. 2012.
The Future of Global Refractory Markets to 2017; Smithers Group Brochure.
C. Shon, D. Zollinger, S. Sarkar "Alkali-Silica Reactivity Resistance of High Volume Fly Ash Cementitious Systems"; Transportation Research Record 1798, Paper No. 02-3826.
S. Shafaatian, A. Akhaven, H. Maraghecki, F. Rajabipour "How does fly ash mitigate alkali-silica reaction (ASR) in accelerated mortar bar test (ASTM C1567)"; Cement and Concrete Composites, vol. 37, Mar. 2013, pp. 143-153.
Saunders, A. et al., Global Cement Brochure: Cement Boards 101, Global Cement Magazine, Jan. 2014.
Siding, US Industry Study with Forecasts for 2018 & 2023, Study #3144, Mar. 2014.
Toolbase.org; Spray-Applied Concrete Walls Brochure.
US Army Corps of Engineers, "Standard Practice for Shotcrete" Engineer Manual No. 1110-2-2005; Jan. 31, 1993.
King, Mike, "Shotcrete market set to increase at a CAGR of 7.8% through to 2018" companiesandmarkets.com, Jun. 26, 2013.

(56) References Cited

OTHER PUBLICATIONS

Silicon Photonics Market by Product (Photonic Wavelength, Optical Modulators, Optical interconnects, WDMF, LED, and Others), Application (Telecommunication, Data communication, and Others) and by Geography—Global Trends and Forecasts to 2014-2020; marketandmarkets.com, Report SE3137, Feb. 2015.
http://www.international.to/index.php?option=com_content&view=article&id=29312:shotcrete-sprayed-concrete-market-poise-$6-5-billion-by-2018&catid=309:pitchengine&itemid=445.
Phillips, Phil, "High Heat Resistant Coating System," Chemark Consulting, Apr. 2009, pp. 24-25.
Technical Bulletin TB-1500 "An Introduction to Sel-Consolidating Concrete (SCC)" Grace Construction Products (www.grace.com/construction).
http://www.pollutionengineering.com/ext/resources/PE/Home/files/pdfs/pca_s-s_whitepaper.pdf?135428601.
Official Action for U.S. Appl. No. 14/067,143 dated Mar. 12, 2015.
Official Action for U.S. Appl. No. 14/098,198 dated Nov. 20, 2014.
Search Report and Written Opinion for International Application PCT/US14/054380 dated Sep. 5, 2014.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/04794 dated Sep. 9, 2014.
Search Report and Written Opinion for International Application PCT/USS14/054496 dated Sep. 8, 2014.
Search Report and Written Opinion for International Application PPCT/US14/068804 dated Mar. 17, 2015.
Search Report and Written Opinion for International Application PCT/US14/067112 dated Mar. 5, 2015.
Ramachandran, V.S. et al., "Conduction Calorimetric Investigation of the Effect of Retarders on the Hydration of Portland Cement," Thermochimica Arts. 195 (1992) 373-387.
Benge, O.G. et al., "Evaluation of Blast Furnace Slag Slurried for Oilfield Application" SPE 27449, (1994,) pp. 169-180.
Allahverrdi, A., et al, "Chemical activation and set acceleration of lime-natural pozzolan cement" Ceramics-Silikaty (2006), pp. 193-199.
Brito, A., et al. "High surface area support/catalyst derived from natural pumice: Study of pretreatment variables," Ind. Eng. Chem. Res., (2004) vol. 443, pp. 1659-1664.
Johnson, C.D., et al, "Zeolitisation of pumice-microporous materials on macroporous support structures derived from natural minerals," J. Mat. Chem., (2004) vol. 17, pp. 476-484.
Mielenz, R.C., (1950) "Effect of calcination on natural pozzolans," Symposium on use of pozzolanic materials in mortars and concretes (pp. 43-92) ASTM., STP99-EB.
Ottana, R. et al., (1982) "Hydrotheermal synthesis of zeolites from pumice in alkaline and saline environment" Zeolites, 2, 295-298.
Palomo, A., et al. "Alkaline activation, procedure for transforming fly ash into new materials. Part 1: Applications" World of Coal Ash (WOCA) Conference (pp. 1-14) Denver CO (May 2011). http:/ww/flyash.info/.
Pisklak, T.J. et al. "Preparation and characterization of mordenite then films via pulsed laser deposition." Journal of Porous Materials 11, (2004); pp. 191-209.
Rebrov, E.V., et al., (2009) "Sol-gel synthesis of zeolite coatings and their application in catalytic microstructured reactors" Catalysis in Industry, vol. 1 No. 4, pp. 322-347.
Saija, L.M. et al., "Zeolitization of pumice in ash-sodium salt solutions" Mat. Chem. Phys. 8, (1983), pp. 207-216.
Shi, C., (2001) "An overview on the activation reactivity of natural pozzolans" Can J Civ. Eng. pp. 778-786.
Shvarzman, A., et al. (2001) "Influence of chemical and phase composition of mineral admixutures on their pozzoanic activity" Advances in Cement Research, vol. 13 No. 1, pp. 1-7.

Ramy N. Eid, Liquid Cement: Changing the Paradigm, Society of Petroleum Engineers, Apr. 15, 2007.
Bernd Nowack and Alan T. Stone "Competitive Adsorption of Phosphate and Phosphonates onto Goethite" Water Research 40 (2006) pp. 2201-2209.
Peter V. Coveney and William Humphries "Molecular Modeling of the Mechanism of Action of Phosphonate Retarders on Hydrating Cements" J. Chem. Soc, Faraday Trans., (1996). 92(5) pp. 831-841).
Yana, Y et al., (1996) "Growth and Engineering of Microporous Zeolite Films and Coatings" MRS Proceedings, 431, p. 211.
Search Report and Written Opinion for PCT International Application PCT/US13/029489 dated Apr. 19, 2013.
Benge, et al., "Deep Gas-Well Cementation: A Review of Risks and Design Basis for Use of a Liquid Cement Preix for Large Offshore Cementing Operations" IADC/SPC 98970, pp. 1-5, IADC/SPE Drilling Conference, 2006.
Rae, et al., "Liquid Cement Premix Introduces New Solutions to Conventional Cementing Problems", IADC/SPE 5086, pp. 393-400, IADC/SPE Drilling Conference, 1996.
Rae, et al., "Liquid Cement Premix for Improved Abandonment and Workover Operations" SPE 36477, pp. 637-643, SPE, Inc., 1996.
Anderson et al., "New Technology Eliminates Bulking in Cementing Operations" SPE 36478, pp. 645-653, SPE, Inc. 1996.
Anderson, et al. "New Technology Improves Cement Slurry Design" SPE 36973, pp. 127-136, SPE, Inc. 1996.
Shaefer et al., "Utilizing 'Over-Seas' Technology Improves the Cementing Processes in the DJ Basin of Colorado".
"Liquid Stone® Cement Technology" Product Sales Bulletin, BJ Services Company, pp. 1-2, Oct. 19, 2004.
HES brochure "Micro Matrix® Cement Retarder" H01481, Aug. 2007.
HES brochure "CFR-3™ Cement Friction Reducer" H01325, Oct. 2005.
Hess Pumice Products, Inc. "Fact Sheet" located at website www.hesspumice.com.
Official Action for U.S. Appl. No. 14/478,869 dated Feb. 26, 2015.
Search Report and Written Opinion for International Application No. PCT/US14/032150 dated Aug. 21, 2014.
Malvern Brochure "Zetasizer Nano ZS" dated 2011.
Nissan Chemical Brochure "Snowtex®" dated 2007.
ThermPhos Brochure "DEQUEST® 2006" printed from the internet on Mar. 25, 2013.
OFI Testing Equipment, Inc, Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "MICRO MATRIX®" dated Nov. 2006.
ThermPhos Brochure "DEQUEST® 2066" printed from the internet on Nov. 18, 2013.
V-Mar 3 Concrete Rheology—Modifying Admixture Product Description available from Grace Construction at na.graceconstruction.com/ viewed Oct. 2013.
Southern Clay Products Data Sheet for LAPONITE RD, available from www.rockwoodadditives.com viewed on Oct. 2013.
Daxed 19 MSDS, available from Geo Specialty Chemicals at www.geosc.com and last revised Sep. 20, 2013.
Liquiment 5581 Product Description available from BASF at www.oilfield-solutions.basf.com/ viewed on Oct. 2013.
Ethacryl G Product Description available from Arkema at www.arkema.com/ viewed on Oct. 2013.
SA-1015 Suspending agent product description available from Halliburton Energy Services at www.halliburton.com viewed on Oct. 2013.
WellLife 684 Additive Product Description available from Halliburton Energy Services of www.halliburton.com viewed on Oct. 2013.
Halad-344 Fluid Loss Additive Product Description available from Halliburton Energy Services at www.halliburton.com viewed on Oct. 2013.
Halliburton brochure for "SentinelCem Cement" dated May 2012.
ZoneSealant™ 2000 Agent Product Description available from www.halliburton.com viewed on Mar. 2014.

(56) References Cited

OTHER PUBLICATIONS

D-Air Defoamer Product Line Description available from www.halliburton.com viewed on Mar. 2014.
HES brochure ENHANCER 923™ Cement Agent, H07745 Jun. 2010.
Halliburton BAROID® Product Data Sheet, Mar. 2010.
Official Action for U.S. Appl. No. 13/417,001 dated Apr. 16, 2014.
How Microsilica Improves Concrete, Publication #C850327. Copyright 1985, The Aberdeen Group.
Non-final Rejection for Application No. 15087961 dated Apr. 17, 2017.
Non-final Rejection for Application No. 15162245 dated Apr. 21, 2017.
Australian Examination Report for Application No. 2016223251 dated Oct. 18, 2017.

\* cited by examiner

SET-DELAYED CEMENT COMPOSITIONS COMPRISING PUMICE AND ASSOCIATED METHODS

CROSS-REFERENCE TO RELATED APPLICATIONS

The present application is a continuation-in-part of U.S. patent application Ser. No. 14/478,869, entitled "Set-Delayed Cement Compositions Comprising Pumice and Associated Methods," filed on Sep. 5, 2014, which is a continuation of U.S. patent application Ser. No. 13/417,001, entitled "Set-Delayed Cement Compositions Comprising Pumice and Associated Methods," filed on Mar. 9, 2012, the entire disclosures of which are incorporated herein by reference.

BACKGROUND

Examples relate to cementing operations and, in certain examples, to set-delayed cement compositions and methods of using set-delayed cement compositions in surface operations.

Cement compositions may be used in a variety of surface operations. For example, a cement composition may be used to make refractory materials such as bricks and monolithic shapes. Similarly, cement may be used to make cement boards for use as tiles, tile substrates, flooring, underlays, counters, shingles, cladding, and the like. In construction applications, molded cement may be used to in construction operations, including marine construction.

A broad variety of cement compositions have been used in surface cementing operations. In some instances, set-delayed cement compositions have been used. Set-delayed cement compositions are characterized by being capable of remaining in a pumpable fluid state for at least about one day (e.g., at least about 7 days, about 2 weeks, about 2 years or more) at room temperature (e.g., about 80° F.). When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in surface applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for applications where space and equipment may be limited.

While set-delayed cement compositions have been developed heretofore, challenges exist with their successful use in surface cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in applications where low temperature may be an issue.

BRIEF DESCRIPTION OF THE DRAWINGS

These drawings illustrate certain aspects of some of the embodiments of the present method, and should not be used to limit or define the method.

DETAILED DESCRIPTION

Examples relate to cementing operations and, in certain examples, to set-delayed cement compositions and methods of using set-delayed cement compositions in surface operations. In particular examples, the set-delayed cement compositions may be used to make molded cement materials. In further examples, the set-delayed cement compositions may be used to make refractory materials such as bricks and monolithic shapes. Similarly, the set-delayed cement compositions may be used to make cement boards for use as tiles, tile substrates, flooring, underlays, counters, shingles, cladding, and the like. Additional examples may comprise using the set-delayed cement compositions for construction applications, such as home construction, marine construction, etc.

The set-delayed cement compositions may generally comprise water, pumice, hydrated lime, and a set retarder. Optionally, the set-delayed cement compositions may further comprise a dispersant and/or a cement set activator. The set-delayed cement compositions may be foamed. Advantageously, the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of cementing operations, they may be particularly suitable for use in applications in which alkali silicate reactions occur. Alkali silicate reactions may crack or deform concrete. The set-delayed cement compositions described herein may prevent alkali silicate reactions from occurring, thus mitigating cracks and deformations in any concrete in which the set-delayed cement composition is used.

The water may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain examples, the water may be present in the set-delayed cement composition in an amount in the range of from about 33% to about 200% by weight of the pumice. In certain examples, the water may be present in the set-delayed cement compositions in an amount in the range of from about 35% to about 70% by weight of the pumice. One of ordinary skill in the art with the benefit of this disclosure will recognize the appropriate amount of water for a chosen application.

Pumice may be present in the set-delayed cement compositions. Generally, pumice is a volcanic rock that can exhibit cementitious properties in that it may set and harden in the presence of hydrated lime and water. The pumice may also be ground. Generally, the pumice may have any particle size distribution as desired for a particular application. In certain examples, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific examples, the pumice may have a mean particle size in a range of from about 1 micron to about 200 microns, from about 5 microns to about 100 microns, or from about 10 microns to about 50 microns. In one particular example, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Hydrated lime may be present in the set-delayed cement compositions. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in the set-delayed cement compositions, for example, to form a hydraulic composition with the pumice. The hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice. In some examples, the hydrated lime may be present in an amount ranging between any of and/or including any of about 10%, about 20%, about 40%, about 60%, about 80%, or about 100% by weight of the pumice. In some examples, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

A set retarder maybe present in the set-delayed cement compositions. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some examples, the set retarder may be present in the set-delayed cement compositions in an amount in the range of from about 0.01% to about 10% by weight of the pumice. In specific examples, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, examples of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water. While a variety of dispersants may be used, polycarboxylated ether dispersants may be particularly suitable for use. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

The dispersant may be included in the set-delayed cement compositions in an amount in the range of from about 0.01% to about 5% by weight of the pumice. In specific examples, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

When desired for use, the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, the set-delayed cement compositions may be activated to form a hardened mass in a time period in the range of from about 10 seconds to about 2 hours. For example, embodiments of the set-delayed cement compositions may set to form a hardened mass in a time period ranging between any of and/or including any of about 10 seconds, about 30 seconds, about 1 minute, about 10 minutes, about 30 minutes, about 1 hour, or about 2 hours.

One or more cement set activators may be added to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In a specific example, the activator may be provided and added to the set-delayed cement composition as a liquid additive, for example, a liquid additive comprising a monovalent salt, a polyphosphate, and optionally a dispersant.

Some embodiments may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring the particle size of the nanosilica is Transmission Electron Microscopy (TEM). An example of a commercially available product based on laser diffraction is the ZETASIZER Nano ZS particle size analyzer supplied by Malvern Instruments, Worcestershire, UK. In some examples, the nanosilica may comprise colloidal nanosilica. The nanosilica may be stabilized using any suitable technique. In some examples, the nanosilica may be stabilized with a metal oxide, such as lithium oxide, sodium oxide, potassium oxide, and/or a combination thereof. Additionally the nanosilica may be stabilized with an amine and/or a metal oxide as mentioned above. Without limitation by theory, it is believed that the nanosilicas have an additional advantage in that they have been known to fill in pore space in cements which can result in superior mechanical properties in the cement after it has set.

Some examples may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for the set-delayed cement compositions disclosed herein. The ratio of the monovalent salt to the polyphosphate may range, for example, from about 5:1 to about 1:25 or from about 1:1 to about 1:10. In some examples the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR-3™ dispersant. One example of a suitable polycarboxylated ether dispersant is Liquiment® 514L or 5581F dispersants, available from BASF Corporation, Houston, Tex.

The cement set activator may be added to the set-delayed cement composition in an amount sufficient to induce the set-delayed cement composition to set into a hardened mass. For example, the cement set activator may be added to the set-delayed cement composition in an amount in the range of about 0.1% to about 20% by weight of the pumice. In specific examples, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

Other additives suitable for use in subterranean cementing operations also may be included in examples of the set-delayed cement compositions. Examples of such additives include, but are not limited to: weighting agents, lightweight additives, mechanical-property-enhancing additives, fluid-loss-control additives, defoaming agents, foaming agents, and combinations thereof. One or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Weighting agents may be included in the set-delayed cement compositions. Weighting agents are typically materials that weigh more than water and may be used to increase the density of the set-delayed cement compositions. By way of example, weighting agents may have a specific gravity of about 2 or higher (e.g., about 2, about 4, etc.). Examples of weighting agents that may be used include, but are not limited to, hematite, hausmannite, barite, and combinations thereof. Specific examples of suitable weighting agents include HI-DENSE® weighting agent, available from Halliburton Energy Services, Inc.

Lightweight additives may be included in the set-delayed cement compositions, for example, to decrease the density of the set-delayed cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art. The resin compositions may generally have lower base densities than the set-delayed cement compositions, thus hollow glass beads and/or foam may be suitable lightweight additives for the set-delayed cement compositions, dependent upon the base densities of the set-delayed cement compositions.

Optionally, cement foaming additives may be included in the set-delayed cement compositions, for example, to facilitate foaming and/or stabilize the resultant foam formed therewith. The foaming additive may include a surfactant or combination of surfactants that reduce the surface tension of the water. As will be appreciated by those of ordinary skill in the art, the foaming additives may be used in conjunction with a gas to produce a foamed set-delayed cement compositions. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Optionally, set accelerators for the set-delayed cement compositions may be included in the set-delayed cement compositions, for example, to increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. For example, aluminum sulfate may be used to accelerate the setting time of the set-delayed cement compositions for surface uses which may require fast setting, for example, roadway repair, consumer uses, etc. The cement set accelerators may be added alongside any cement set activators when setting of the set-delayed cement compositions is desired. Alternatively, the set accelerators may be added before the cement set activator if desired, and if the set accelerator does not induce premature setting. Without being limited by theory, aluminum sulfate may promote the formation of sulfate containing species (e.g., ettringite) which may modify the rheology of the matrix during hydration such that textural uniformity and adherence to a surface is improved. Set accelerators may produce a set-delayed cement composition with a thickening time of less than 10 minutes, alternatively less than 5 minutes, alternatively, less than 1 minute, or further alternatively less than 30 seconds.

Optionally, mechanical-property-enhancing additives for set-delayed cement compositions may be included in the set-delayed cement compositions, for example, to ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, fluid-loss-control additives for cement may be included in the set-delayed cement compositions, for example, to decrease the volume of fluid that is lost. Properties of the set-delayed cement compositions may be significantly influenced by their water content. The loss of fluid can subject the set-delayed cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, cement defoaming additives may be included in the set-delayed cement compositions, for example, to reduce the tendency of the set-delayed cement compositions to foam during mixing and pumping of the set-delayed cement compositions. Examples of suitable defoaming additives include, but are not limited to, polyol silicone compounds. Suitable defoaming additives are available from Halliburton Energy Services, Inc., under the product name D-AIR™ defoamers.

Optionally, fibers may be included in the set-delayed cement compositions, for example, to enhance the tensile and ductile properties the set-delayed cement compositions. Examples of suitable fibers include, but are not limited to, polyvinylalcohol, polypropylene, carbon, glass etc. Further, the fluidic nature and storage capabilities of the set-delayed cement composition allow for fibers which may, in other compositions, require high shear and high pressure pumping conditions for dispersion, to be dispersed using low. This is particularly advantageous in systems where the fibers may bridge and plug pumping equipment.

Optionally, refractory materials may be included in the set-delayed cement compositions, for example, to provide a set-delayed cement composition with higher heat resistance. Examples of suitable refractory materials include, but are not limited to, alumina, titanium, fire brick grog, etc. These refractory materials may be of particular importance in applications where fire and heat resistance is particularly important, for example, in consumer applications in the home.

The set-delayed cement compositions may possess properties beneficial for use in concrete applications. For example, in a typical concrete formulation, the aggregate (e.g., chert, quartzite, opal, strained quartz crystals, etc.) may be dissolved by the basic pore solution of the cement in what is known as an alkali silicate reaction. The dissolved portion of the aggregate may then react with calcium species present in the cement pore solution to form a calcium-silicate-hydrate gel. This alkali silicate reaction may be represented by Equation 1 below:

$$Ca(OH)_2 + H_4SiO_4 \rightarrow Ca^{2+} + H_2SiO_4^{2-} + 2H_2O \rightarrow CaH_2SiO_4 \cdot 2H_2O \quad (Eq.\ 1)$$

The calcium-silicate-hydrate gel formed from the aggregate, effectively increases the size of the aggregate. This increase in size may exert a force on the surrounding cement that consequently causes cracks or deformations in the surrounding cement. Without limitation by theory, it is believed that the set-delayed cement compositions may prevent or mitigate any alkali silicate reactions by binding the alkali materials present, increasing the tensile strength of the concrete, and/or by reducing the dissolution rate of the aggregate (e.g., the set-delayed cement compositions may have a pore solution pH of 12.5 as compared to a pH of 13.2 for standard concrete). Furthermore the set-delayed cement composition may be formulated such that the hydrated lime may be completely consumed by the pumice and thus prevent any initial dissolution of the aggregate.

The set-delayed cement compositions may be used in prefabrication applications. The prefabrication applications may be continuous or noncontinuous as desired. The set-delayed cement compositions may be used with molds, dies, extruders, etc. to be conformed to various shapes, structures, sizes, etc. The set-delayed cement compositions may be used to form tiles, flooring, underlay, counters, backsplashes, roofing, shingles, shales, weatherboard, façade cladding, prefabricated houses, exterior and partition walls, acoustic and thermal insulation, soffits, ceilings, architraves, bricks, monolithic shapes, etc. The materials may have a high heat resistance. Further, refractory materials may be added to the materials to increase the heat resistance. The materials may be dyed or may comprise decorative aggregate such as glitter or beads if desired. The materials formed from the set-delayed cement compositions may also be used in various construction applications, for example, in marine construction, home construction, etc.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some examples, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

Those of ordinary skill in the art will appreciate that the set-delayed cement compositions should have a density suitable for a particular application. By way of example, the set-delayed cement compositions may have a density in the range of from about 4 pounds per gallon ("lb/gal") to about 20 lb/gal. In certain examples, the set-delayed cement compositions may have a density in the range of from about 8 lb/gal to about 17 lb/gal. Examples of the set-delayed cement compositions may be foamed or unfoamed or may comprise other means to reduce their densities, such as hollow microspheres, low-density elastic beads, or other density-reducing additives known in the art. In examples, the density may be reduced after storing the composition, but prior to placement in a subterranean formation. Those of ordinary skill in the art, with the benefit of this disclosure, will recognize the appropriate density for a particular application. In some examples, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some examples, the set-delayed cement compositions may develop a compressive strength in 24 hours of at least about 50 psi, at least about 100 psi, at least about 500 psi, or more. In some examples, the compressive strength values may be determined using destructive or non-destructive methods at a temperature ranging from 100° F. to 200° F.

In some examples, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The thickening time may be modified for any temperature at atmospheric pressure by modification of the formula, concentration of additives (e.g. activator/accelerator), etc. In some examples, the set-delayed cement compositions may have a thickening time at atmospheric pressure and surface temperatures between about 30 seconds to about 10 hours. For example, the set-delayed cement compositions may have a thickening time of greater than about 30 seconds, greater than about 1 minute, greater than about 10 minutes, greater than about 1 hour, or greater than about 10 hours.

In some examples, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some examples, the set-delayed cement composition may remain in storage for a time period in a range of from about 1 day to about 7 days or longer. Thereafter, the set-delayed cement composition may be activated, for example, by addition of a cement set activator, used in a cementing or concrete application and allowed to set in the course of said application.

A method of forming a set cement shape may be provided. The method may be used in conjunction with one or more of the methods, compositions, and/or systems illustrated in FIGS. 1-3. The method may comprise providing a set-delayed cement composition comprising water, pumice, hydrated lime, and a set retarder; forming the set-delayed cement composition into a shape; and allowing the shaped set-delayed cement composition to set. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nanosilica, polyphosphate, and any combination thereof. The set-delayed cement composition comprising the cement set activator may further comprise a thickening time in a range between about 30 seconds to about 10 minutes. The set-delayed cement composition may further comprise a fiber. The set-delayed cement composition may further comprise a dispersant selected from the group consisting of a sulfonated-formaldehyde-based dispersant, a polycarboxylated ether dispersant, and any combination thereof. Prior to the forming step, the set-delayed cement composition may be stored for a period of at least about 1 day. Forming the set-delayed cement composition into a shape may comprise forming the set-delayed cement composition using at least one of a mold, extruder, die, or a combination thereof. The method may be a continuous process. The set shaped set-delayed cement composition may comprise a shaped set-delayed cement product selected from the group consisting of a tile, flooring, underlay, a counter, a backsplash, roofing, a shingle, a shale, weatherboard, façade, cladding, a prefab-ricated house, an exterior wall, a partition wall, acoustic insulation, thermal insulation, a soffit, a ceiling, an architrave, a brick, a monolithic shape, and any combination thereof. The set-delayed cement composition may comprise a refractory material. The set-delayed cement composition may comprise a dye and/or a bead.

A method of forming a molded set cement may be provided. The method may be used in conjunction with one or more of the methods, compositions, and/or systems illustrated in FIGS. 1-3. The method may comprise providing a set-delayed cement composition comprising water, pumice, hydrated lime, and a set retarder; introducing the set-delayed cement composition into a mold; and allowing the set-delayed cement composition to set in the mold. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nanosilica, polyphosphate, and any combination thereof. The set-delayed cement composition comprising the cement set activator may further comprise a thickening time in a range between about 30 seconds to about 10 minutes. The set-delayed cement composition may further comprise a fiber. The set-delayed cement composition may further comprise a dispersant selected from the group consisting of a sulfonated-formaldehyde-based dispersant, a polycarboxylated ether dispersant, and any combination thereof. Prior to the introducing step, the set-delayed cement composition may be stored for a period of at least about 1 day. The introducing the set-delayed cement composition into a mold may comprise extruding the set-delayed cement composition through an extruder into the mold. The method may be a continuous process. The set molded set-delayed cement composition may comprise a molded set-delayed cement product selected from the group consisting of a tile, flooring, underlay, a counter, a backsplash, roofing, a shingle, a shale, weatherboard, façade, cladding, a prefabricated house, an exterior wall, a partition wall, acoustic insulation, thermal insulation, a soffit, a ceiling, an architrave, a brick, a monolithic shape, and any combination thereof. The set-delayed cement composition may comprise a refractory material. The set-delayed cement composition may comprise a dye and/or a bead.

A system may be provided. The system may be used in conjunction with one or more of the methods, compositions, and/or systems illustrated in FIGS. 1-3. The system may comprise a set-delayed cement composition comprising: water, pumice, hydrated lime, and a set retarder, wherein the set-delayed cement composition is capable of remaining in a pumpable fluid state for at least about one day at about 80° F.; a cement set activator; a vessel capable of containing the set-delayed cement composition, and a mold. The system may further comprise an extruder. The set-delayed cement composition may further comprise a fiber. The set retarder may comprise at least one retarder selected from the group consisting of a phosphate, a phosphonate, a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof. The set-delayed cement composition may further comprise a cement set activator selected from the group consisting of a zeolite, amine, silicate, Group IA hydroxide, Group IIA hydroxide, monovalent salt, divalent salt, nano-silica, polyphosphate, and any combination thereof. The set-delayed cement composition comprising the cement set activator may further comprise a thickening time in a range between about 30 seconds to about 10 minutes. The set-delayed cement composition may further comprise a fiber. The set-delayed cement composition may further comprise a dispersant selected from the group consisting of a sulfonated-formaldehyde-based dispersant, a polycarboxylated ether dispersant, and any combination thereof.

Figure 1:
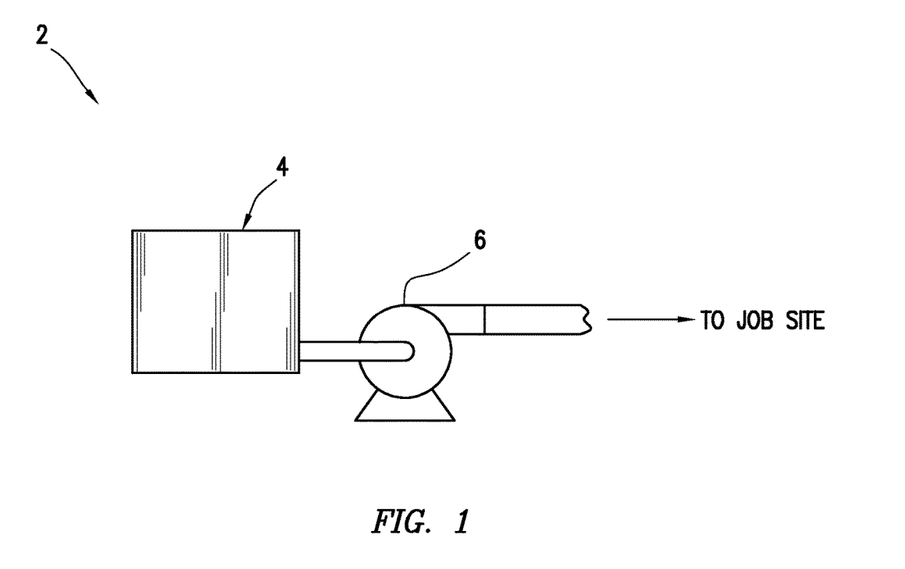
FIG. 1 illustrates a system for the preparation of a set-delayed cement composition and subsequent delivery of the composition to a cementing application site.

Referring now to FIG. 1, the preparation of a set-delayed cement composition in accordance with the examples described herein will now be described. FIG. 1 illustrates a fluid handling system 2 for the preparation of a set-delayed cement composition and subsequent delivery of the composition to a cementing application site. As shown, the set-delayed cement composition may be mixed and/or stored in a vessel 4. Vessel 4 may be any such vessel suitable for containing and/or mixing the set-delayed cement composition, including, but not limited to drums, barrels, tubs, bins, jet mixers, re-circulating mixers, batch mixers, and the like. The set-delayed cement composition may then be pumped via pumping equipment 6. In some embodiments, the vessel 4 and the pumping equipment 6 may be disposed on one or more cementing units as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit. Further, in embodiments requiring a concrete, aggregate may be mixed with the set-delayed cement composition in vessel 4 before being pumped via pumping equipment 6.

Figure 2A:
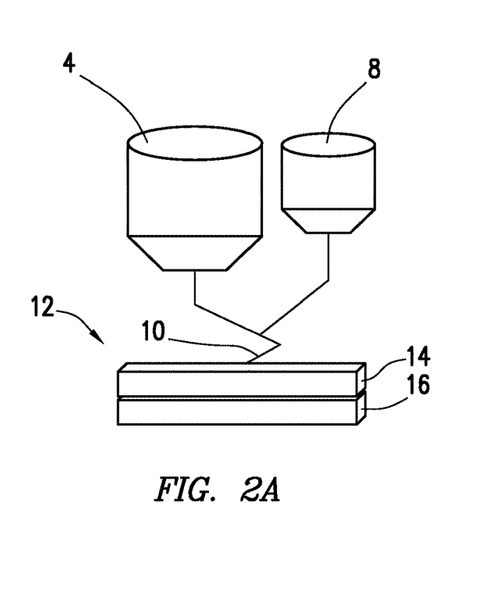
FIG. 2A illustrates the use of the set-delayed cement composition in a molding application.
Figure 2B:
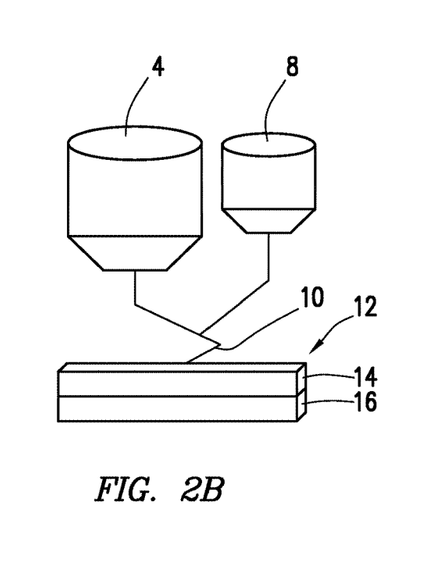
FIG. 2B illustrates the further use of the set-delayed cement compositions in a molding application.
Figure 2C:
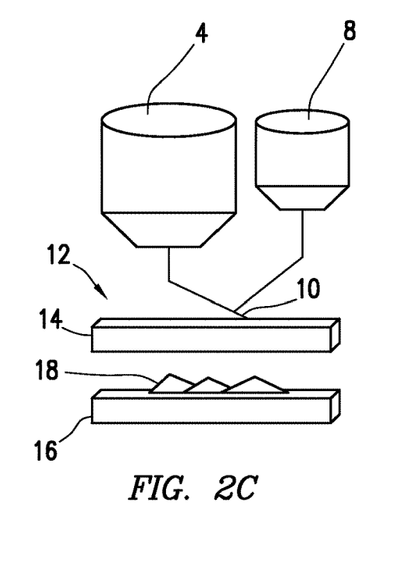
FIG. 2C illustrates the further use of the set-delayed cement composition in a molding application.

FIGS. 2A-2C illustrate the use of the set-delayed cement composition in an injection molding application. Vessel 4 may be used a store a set delayed cement composition. Activator injector 8 may be used to store a cement set activator. The set-delayed cement composition disposed within vessel 4 may be pumped into injection line 10 where it may be mixed with cement set activator from activator injector 8. The mixture of set-delayed cement composition and cement set activator may be injected into a mold 12 comprising a top portion 14 and bottom portion 16. As shown by FIG. 2B, heat and pressure may be applied to mold 12 and top portion 14 may be pressed together with bottom portion 16. After a desired interval of time has passed, the bottom portion 16 of mold 12 may be separated from the top portion 14, revealing a set cement product 18. Set cement product 18 may comprise a shape, size, or general product type as determined by the mold 12. Examples of set cement product 18 may include, but should not be limited to, tiles, flooring, underlay, counters, backsplashes, roofing, shingles, shales, weatherboard, façade cladding, prefabricated houses, exterior and partition walls, acoustic and thermal insulation, soffits, ceilings, architraves, bricks, monolithic shapes, etc. The materials may have a high heat resistance. Further, refractory materials may be added to the materials to increase the heat resistance. The materials may be dyed or may comprise decorative aggregate such as glitter or beads if desired. The materials formed from the set-delayed cement compositions may also be used in various construction applications, for example, in marine construction, home construction, etc.

Figure 3A:
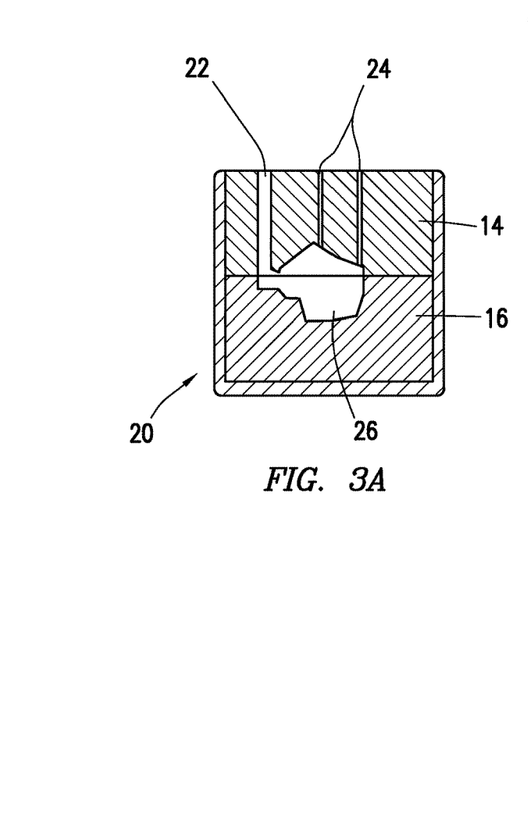
FIG. 3A illustrates the use of the set-delayed cement composition in another molding application.
Figure 3B:
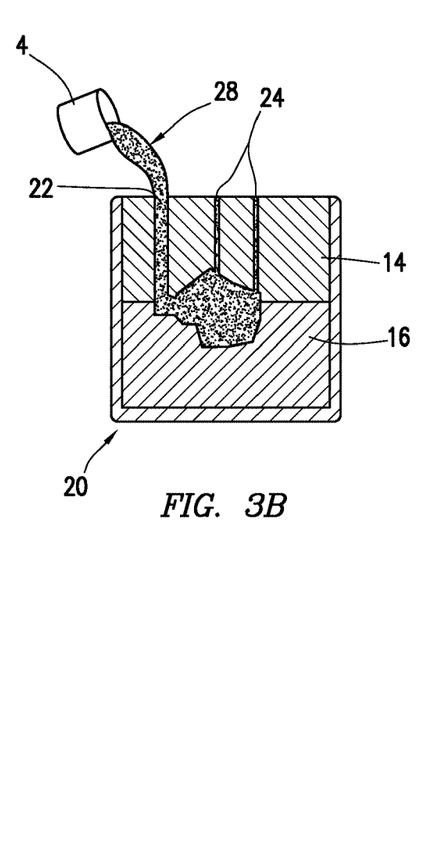
FIG. 3B illustrates the further use of the set-delayed cement composition in another molding application.
Figure 3C:
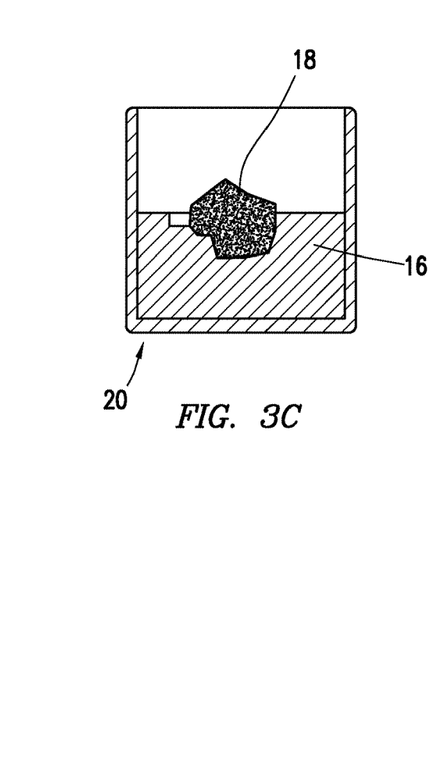
FIG. 3C illustrates the further use of the set-delayed cement composition in another molding application.

FIGS. 3A-3C illustrate the use of the set-delayed cement composition in a casting application. A cast mold 20 comprising a top portion 14 and a bottom portion 16 is illustrated on FIG. 3A. The top portion 14 may comprise an opening 22 and vents 24. A hollow cavity 26 may be formed on the interior of cast mold 20 by the interior surfaces of top portion 14 and bottom portion 16. As shown in FIG. 3B, vessel 4 may be used to store a set delayed cement composition that has been mixed with a cement set activator to form an activated set-delayed cement composition 28. Activated set-delayed cement composition 28 may be poured into opening 22 such that the activated set-delayed cement composition 28 fills the hollow cavity 26 within cast mold 20. The activated set-delayed cement composition 28 may then be allowed to set. After the activated set-delayed cement composition 28 has set, the top portion 14 of cast mold 20 may be removed to reveal set cement product 18. Set cement product 18 may comprise and shape, size, or general product type as determined by the mold 12. Examples of set cement product 18 may include, but should not be limited to tiles, flooring, underlay, counters, backsplashes, roofing, shingles, shales, weatherboard, façade cladding, prefabricated houses, exterior and partition walls, acoustic and thermal insulation, soffits, ceilings, architraves, bricks, monolithic shapes, etc. The materials may have a high heat resistance. Further, refractory materials may be added to the materials to increase the heat resistance. The materials may be dyed or may comprise decorative aggregate such as glitter or beads if desired. The materials formed from the set-delayed cement compositions may also be used in various construction applications, for example, in marine construction, home construction, etc.

A specific example of a molding application is the prefabrication of cement boards. Cement boards may be preformed from a mixture of the disclosed set-delayed cement compositions and reinforcing fibers. Optionally the boards may comprise an aggregate such as sand or fly ash. Some of the applications using cement boards may comprise tile substrates, flooring, underlay, counters, backsplashes, roofing, shingles, shales, weatherboard, façade, cladding, prefabricated houses, exterior and partition walls, acoustic and thermal insulation, soffits, ceilings, architraves, and the like. Further, cement boards made from the set-delayed cement compositions disclosed herein may replace Portland cement made cement boards. The set-delayed cement compositions disclosed herein produce less $CO_2$ during manufacture relative to Portland cement, and thus, provide an environmental advantage over Portland cement.

Additional examples may comprise using a set-delayed cement composition with an extruder. For example, a set-delayed cement composition may be mixed with a cement set accelerator (and any optional fibers or dyes as desired) and then metered and pumped to an extruder where it may be heated and further mixed. The extruder may act as a pump to meter the activated set-delayed cement composition into dies that form a predesigned shape (e.g., a tile). Optionally, the shapes may be formed continuously in a sheet. The tile (or sheets) may then be passed to a heating and drying over with set parameters that allow for measured control over the setting process. If a continuous sheet has been used, the dried sheet may then be cut at desired lengths. This process may be continuous or noncontinuous as desired. Analogously, the extruder may extrude the activated set-delayed cement composition into a mold or molds in a continuous or noncontinuous process. The mold or molds may then be inverted and the set cement products ejected. Such process may be used to make a variety of materials including tiles, shingles, bricks, etc.

Additionally, the set-delayed cement compositions may provide a heat resistant coating to a surface. The disclosed set-delayed cement composition may be stable up to temperatures as high as 400° F. Therefore, coating a surface with the set-delayed cement compositions disclosed herein may impart a heat resistant coating to the surface. Further, as discussed above, heat refractory materials may be added to the set-delayed cement compositions to increase the heat resistance of the set-delayed cement compositions. Such materials may comprise, but are not limited to, alumina, titanium, fire brick grog, and the like.

As discussed above, the set-delayed cement compositions may be used to make refractory materials such as bricks and monolithic shapes. The set-delayed cement compositions may withstand temperatures greater than 400° F. These refractory materials may be used in the construction of high temperature reactors, kilns, furnaces, etc. Further, the set-delayed cement compositions may constitute an environmentally friendly alternative as compared to conventional refractory materials that may be processed through kilns or firing processes.

The set-delayed cement compositions may be used in decorative applications. Such as decorative masonry where the control and/or variation of color is desirable. The set-delayed cement compositions are easy to dye and may be dyed to a variety of colors either during manufacturer of later by an end purchaser. Further, the set-delayed cement compositions possess a sufficient rheology for the dispersal of decorative aggregate such as beads or glitter. The aggregate may be used to provide aesthetic or textural effects in the set-delayed cement composition.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

The following series of tests was performed to evaluate the force resistance properties of comparative cement compositions comprising pumice and hydrated lime. Three different comparative sample settable compositions, designated Samples 1-3, were prepared using pumice (DS-325 lightweight aggregate), hydrated lime, Liguiment® 514L dispersant, and water, as indicated in the table below. After preparation, the samples were placed in an UCA and cured at 140° F. and 3,000 psi for 24 hours. The cured cement was then removed from the UCA and crushed to yield the compressive strength values provided in Table 1 below.

TABLE 1

| Compressive Strength Tests | | | | |
| --- | --- | --- | --- | --- |
| Sample | | 1 | 2 | 3 |
| Density | lb/gal | 14.3 | 14.3 | 14.3 |
| Pumice:Lime Wt. Ratio | | 3:1 | 4:1 | 5:1 |
| Pumice | g | 400 | 400 | 400 |
| Lime | g | 134 | 103 | 100 |
| Dispersant | g | 12 | 4 | 13 |
| Water | g | 196 | 187 | 220 |
| 24-Hr Crush Strength | psi | 2,240 | 1,960 | 2,130 |

Example 1 thus indicates that cement compositions that comprise pumice and lime in a weight ratio ranging from 3:1 to 5:1 may develop compressive strengths suitable for particular applications.

Example 2

A sample set-delayed cement composition, designated Sample 4, having a density of 13.3 lb/gal was prepared that comprised 500 grams of pumice (DS-325 lightweight aggregate), 100 grams of hydrated lime, 13 grams of Liquiment® 514L dispersant, 24 grams of Micro Matrix® cement retarder, and 300 grams of water. The rheological properties of the sample were measured after storing at room temperature and pressure for periods of 1 day and 6 days. After preparation, the rheological properties of the sample were determined at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 2

Viscosity Tests

| Age of Sample | Fann Readings | | | | | | Yield Point | Plastic Viscosity |
|---|---|---|---|---|---|---|---|---|
| (days) | 600 | 300 | 200 | 100 | 6 | 3 | (lb/100 ft$^{2)}$) | (centipoise) |
| 1 | 560 | 322 | 244 | 170 | 46 | 38 | 84 | 238 |
| 6 | 498 | 310 | 228 | 136 | 24 | 20 | 122 | 188 |

Example 2 thus indicates that set-delayed cement compositions that comprise pumice, hydrated lime, a dispersant, a set retarder, and water can remain fluid after 6 days.

Example 3

A sample set-delayed cement composition, designated Sample 5, having a density of 13.4 lb/gal was prepared that comprised 500 grams of pumice (DS-325 lightweight aggregate), 100 grams of hydrated lime, 7 grams of Liquiment® 514L dispersant, 6.3 grams of Micro Matrix® cement retarder, and 304 grams of water. The rheological properties of the sample were measured after storing at room temperature and pressure for periods of from 1 day to 19 days. The rheological properties were measured at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 3

Viscosity Tests

| Age of Sample | Fann Readings | | | | |
|---|---|---|---|---|---|
| (Days) | 300 | 200 | 100 | 6 | 3 |
| 1 | 462 | 300 | 130 | 12 | 8 |
| 2 | 458 | 282 | 122 | 6 | 4 |
| 5 | 420 | 260 | 106 | 3 | 2 |
| 8 | 446 | 270 | 110 | 4 | 1 |
| 12 | 420 | 252 | 100 | 3 | 2 |
| 19 | 426 | 248 | 94 | 2 | 1 |

After 7 days, calcium chloride in the amount indicated in Table 4 below was added to a separately prepared sample of the same formulation as above. The sample was then placed in an UCA and the initial setting time, which is the time for the composition to reach a compressive strength of 50 psi while maintained at 3,000 psi was determined in accordance with API RP Practice 10B-2, *Recommended Practice for Testing Well Cements*. The initial setting time of the sample was also determined without addition of the calcium chloride. The samples with and without the calcium chloride were heated to a temperature of 140° F. in 30 minutes and then maintained at that temperature throughout the test.

TABLE 4

Compressive Strength Tests

| Age of Sample (Days) | Test Temperature (° F.) | CaCl$_2$ (% by wt of Pumice & Lime) | Initial Setting Time (hr:min) |
|---|---|---|---|
| 7 | 140 | 0 | no set after 4 days |
| 7 | 140 | 10 | 5:11 |

Example 3 thus indicates that the set-delayed cement compositions that comprise pumice, hydrated lime, a dispersant, a set retarder, and water will not set for a period of at least 19 days at ambient temperature and over 4 days at 140° F. Example 3 further indicates that sample set-delayed cement compositions may be activated at a desired time by addition of a suitable activator.

Example 4

A sample set-delayed cement composition, designated Sample 6, having a density of 13.4 lb/gal was prepared that comprised pumice (DS-325 lightweight aggregate), 20% hydrated lime, 1.4% Liquiment® 514L dispersant, 1.26% Micro Matrix® cement retarder, and 62% of water (all by weight of pumice, referred to in the table below as "% bwop"). After 45 days in storage at ambient conditions, the sample was mixed with 6% calcium chloride. At 140° F., the sample had a thickening time (time to 70 BC) of 2 hours and 36 minutes and an initial setting time (time to 50 psi) of 9 hours and 6 minutes as measured using an UCA while maintained at 3000 psi. After 48 hours, the sample was crushed with a mechanical press which gave a compressive strength of 2,240 psi. The thickening time and initial setting time were both determined in accordance with API RP Practice 10B-2, *Recommended Practice for Testing Well Cements*. The results of this test are set forth in the table below.

TABLE 5

Compressive Strength Tests

| Age of Sample (Days) | Test Temperature (° F.) | Calcium Chloride (% bwop) | Thickening Time (hr:min) | Initial Setting Time (hr:min) | 48 Hr Crush Strength (psi) |
|---|---|---|---|---|---|
| 45 | 140 | 6 | 2:36 | 9:36 | 2,240 |

Example 4 thus indicates that the set-delayed cement compositions that comprise pumice, hydrated lime, a dispersant, a set retarder, and water will not set for a period of at least 45 days at ambient temperature. Example 4 further indicates that sample set-delayed cement compositions may be activated at a desired time by addition of a suitable activator.

Example 5

This example was performed to evaluate the ability of sodium hydroxide and sodium sulfate to activate a set-delayed cement composition that comprised pumice (DS-325 lightweight aggregate), hydrated lime, Liquiment® 514L dispersant, Micro Matrix® cement retarder, and water. Four sample set-delayed cement compositions, designated Samples 7-10, were prepared having concentrations of components as indicated in the table below. The samples were monitored via an UCA. After the samples were placed in the UCA, the pressure was increased to 3,000 psi, and the temperature was increased to 100° F. over a 15-minute time period and held for the duration of the test. A portion of the slurry was retained and poured into a plastic cylinder to monitor the slurry behavior at room temperature and pressure. These procedures were repeated for all samples.

Sample 7 was monitored for 72 hours over which time no strength was developed and the slurry was still pourable when removed from the UCA. The portion kept at room temperature and pressure was likewise still pourable after 72 hours.

Sample 8 was prepared using the same slurry design as Sample 7 except that sodium hydroxide was added as an activator. The sodium hydroxide was added in solid form directly to the mixing jar that contained the prepared sample. As can be seen from Table 6, Sample 8, reached 50 psi of compressive strength at 16 hours and 36 minutes. The strength continued to build, reaching a maximum of 1,300 psi, when the test was stopped at 72 hours. The cured cement was removed from the UCA and crushed with a mechanical press which gave a compressive strength of 969 psi. The portion kept at room temperature and pressure was crushed after 7 days resulting in a compressive strength of 143 psi.

Sample 9 was prepared using the same slurry design as Sample 8 except that sodium sulfate was added as an activator. The sodium sulfate was added in solid form directly to the mixing jar that contained the prepared slurry. Sample 9 reached 50 psi of compressive strength at 67 hours and 29 minutes. The strength continued to build, slowly, reaching a maximum of 78 psi, when the test was stopped at 72 hours. The cured cement was removed from the UCA and crushed with a mechanical press which gave a compressive strength of 68.9 psi. The portion kept at room temperature and pressure was still too soft to be crushed after 7 days.

Sample 10 was prepared using the same slurry design as Sample 8 except that equal amounts of sodium hydroxide and sodium sulfate were added as an activator. The sodium hydroxide and sodium sulfate were added in solid form directly to the mixing jar that contained the prepared slurry. Sample 10 reached 50 psi of compressive strength at 22 hours and 40 minutes. The strength continued to build, reaching a maximum of 900 psi, when the test was stopped at 72 hours. The cured cement was removed from the UCA and crushed with a mechanical press which gave a compressive strength of 786 psi. The portion kept at room temperature and pressure was crushed after 7 days resulting in a compressive strength of 47.9 psi.

The results of these tests are set forth in the table below. The abbreviation "% bwop" refers to the percent of the component by weight of the pumice. The abbreviation "gal/sk" refers to gallons of the component per 46-pound sack of the pumice. The abbreviation "RTP" refers to room temperature and pressure.

TABLE 6

Compressive Strength Tests

| Sample | | 7 | 8 | 9 | 10 |
|---|---|---|---|---|---|
| Density | lb/gal | 13.38 | 13.38 | 13.38 | 13.38 |
| Water | % bwop | 61.97 | 63.60 | 64.62 | 64.11 |
| Pumice | % bwop | 100 | 100 | 100 | 100 |
| Hydrated Lime | % bwop | 20 | 20 | 20 | 20 |
| Dispersant | gal/sk | 0.07 | 0.07 | 0.07 | 0.07 |
| Set Retarder | % bwop | 0.06 | 0.06 | 0.06 | 0.06 |
| Sodium Hydroxide | % bwop | — | 4 | — | 2 |
| Sodium Sulfate UCA | % bwop | — | — | 4 | 2 |
| Temp/Press | F./Psi | 100/3000 | 100/3000 | 100/3000 | 100/3000 |
| Initial Set (50 psi) | hr:min | >78 | 16:36 | 67:29 | 22:40 |
| Final Set (100 psi) | hr:min | — | 21:08 | — | 32:44 |
| 24 Hr Comp. Strength | psi | — | 138.74 | — | 59.60 |
| 48 Hr Comp. Strength | psi | — | 711.35 | — | 331.48 |
| 72 Hr Comp. Strength | psi | — | 1300 | 78 | 900 |
| 72 Hr Crush Strength (UCA) | psi | — | 969 | 68.90 | 786 |
| 7-Day Crush Strength (RTP) | psi | — | 143.20 | 0.00 | 47.90 |

Example 5 thus indicates that sodium hydroxide, sodium sulfate, and combinations of the two can activate the set-delayed cement compositions, but to varying degrees. The testing showed that both sodium hydroxide and combinations of sodium hydroxide with sodium sulfate activated the cement compositions to an acceptable level. When compared to the non-activated composition, sodium sulfate activated the cement compositions, but much less so than the sodium hydroxide or combination of sodium hydroxide and sodium sulfate.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of forming a set cement, the method comprising:
   mixing a set-delayed cement composition with an activator composition to form an activated cement composition;
   placing the activated cement composition into a cavity of an injection mold, wherein the injection mold comprises a first part and a second part, and wherein the cavity is defined by an interior surface of the first part and by an interior surface of the second part;
   setting the activated cement composition in the injection mold to from a hardened mass; and
   separating the first part of the injection mold from the second part of the injection mold to reveal the hardened mass,
   wherein the set-delayed cement composition comprises pumice, lime in an amount of about 20% to about 40% by weight of the pumice, water in an amount of about 35% to about 70% by weight of the pumice, and a phosphonic acid set retarder in an amount of about 1% to about 4% by weight of the pumice, wherein the set-delayed cement composition does not contain any additional components that hydraulically set in the presence of water other than the pumice and hydrated lime, wherein the set-delayed cement composition is capable of remaining in a pumpable fluid state for a period of at least one day or longer at room temperature, wherein the activator composition comprises a cement set activator and aluminum sulfate as an accelerator, and wherein after and as a result of the step of mixing, the activated cement composition undergoes said setting so as to form the hardened mass in a time period of about 10 seconds to about 10 minutes.

2. The method of claim 1, wherein the set delayed cement composition further comprises an additional set retarder selected from the group consisting of a phosphate, a phosphonate, a phosphonic acid, a phosphonic acid derivative, a lignosulfonate, an organic acid, a carboxymethylated hydroxyethylated cellulose, a synthetic co- or ter-polymer comprising sulfonate and carboxylic acid groups, a borate compound, and any mixture thereof.

3. The method of claim 1, wherein the cement set activator is selected from the group consisting of a zeolite, amine, silicate, Group IA hydroxide, Group IIA hydroxide, monovalent salt, divalent salt, nanosilica, polyphosphate, and any combination thereof.

4. The method of claim 1, wherein the set-delayed cement composition further comprises a fiber.

5. The method of claim 1, wherein the set-delayed cement composition further comprises a dispersant selected from the group consisting of a sulfonated-formaldehyde-based dispersant, a polycarboxylated ether dispersant, and any combination thereof.

6. The method of claim 1, further comprising, prior to the placing step, storing the set-delayed cement composition for a period of at least about 1 day.

7. The method of claim 1, wherein the cavity comprises a shape selected from the group consisting of a tile, flooring, underlay, a counter, a backsplash, roofing, a shingle, a shale, weatherboard, façade, cladding, an exterior wall, a partition wall, acoustic insulation, thermal insulation, a soffit, a ceiling, an architrave, a brick, a monolithic shape, and any combination thereof.

8. The method of claim 1, wherein the set-delayed cement composition further comprises a refractory material.

9. The method of claim 1, wherein the set-delayed cement composition further comprises a dye and/or a bead.

10. A method of forming a molded set cement, the method comprising:
    mixing a set-delayed cement composition with an activator composition to form an activated cement composition;
    placing the activated cement composition into a cavity of a cast mold, wherein the cast mold comprises a first part and a second part, and wherein the cavity is defined by an interior surface of the first part and by an interior surface of the second part;
    setting the activated cement composition in the cast mold to from a hardened mass; and
    removing the first part of the cast mold to reveal the hardened mass,
    wherein the set-delayed cement composition comprises pumice, lime in an amount of about 20% to about 40% by weight of the pumice, water in an amount of about 35% to about 70% by weight of the pumice, and a phosphonic acid set retarder in an amount of about 1% to about 4% by weight of the pumice, wherein the set-delayed cement composition does not contain any additional components that hydraulically set in the presence of water other than the pumice and hydrated lime, wherein the set-delayed cement composition is capable of remaining in a pumpable fluid state for a period of at least one day or longer at room temperature, wherein the activator composition comprises a cement set activator and aluminum sulfate as an accelerator, and wherein after and as a result of the step of mixing, the activated cement composition undergoes said setting so as to form the hardened mass in a time period of about 10 seconds to about 10 minutes.

11. The method of claim 10, wherein the set delayed cement composition further comprises an additional set retarder selected from the group consisting of a phosphate, a phosphonate, a phosphonic acid, a phosphonic acid derivative, a lignosulfonate, an organic acid, a carboxymethylated hydroxyethylated cellulose, a synthetic co- or ter-polymer comprising sulfonate and carboxylic acid groups, a borate compound, and any mixture thereof.

12. The method of claim 10, wherein the cement set activator is selected from the group consisting of a zeolite, amine, silicate, Group IA hydroxide, Group IIA hydroxide, monovalent salt, divalent salt, nanosilica, polyphosphate, and any combination thereof.

* * * * *